(12) United States Patent
Vlcek et al.

(10) Patent No.: US 10,549,360 B2
(45) Date of Patent: Feb. 4, 2020

(54) INDEXABLE CUTTING INSERT FOR AN END MILL TOOL AND AN END MILL TOOL PROVIDED WITH SUCH AN INSERT

(71) Applicant: PRAMET TOOLS, S.R.O., Sumperk (CZ)

(72) Inventors: Jan Vlcek, Sumperk (CZ); Jan Bittner, Sumperk (CZ)

(73) Assignee: PRAMET TOOLS, S.R.O., Sumperk (CZ)

(*) Notice: Subject to any disclaimer, the term of this patent is extended or adjusted under 35 U.S.C. 154(b) by 0 days.

(21) Appl. No.: 16/073,104

(22) PCT Filed: Jan. 13, 2017

(86) PCT No.: PCT/EP2017/050673
§ 371 (c)(1),
(2) Date: Jul. 26, 2018

(87) PCT Pub. No.: WO2017/129423
PCT Pub. Date: Aug. 3, 2017

(65) Prior Publication Data
US 2019/0030629 A1  Jan. 31, 2019

(30) Foreign Application Priority Data
Jan. 27, 2016 (EP) .................................... 16152998

(51) Int. Cl.
*B23C 5/20* (2006.01)
*B23C 5/22* (2006.01)

(52) U.S. Cl.
CPC ............. *B23C 5/2221* (2013.01); *B23C 5/207* (2013.01); *B23C 2200/0411* (2013.01); *B23C 2200/203* (2013.01); *B23C 2200/205* (2013.01)

(58) Field of Classification Search
CPC ....... B23C 2200/0411; B23C 2200/205; B23C 2200/165; B23C 2200/125;
(Continued)

(56) References Cited

U.S. PATENT DOCUMENTS

2006/0013661 A1* 1/2006 Long, II .............. B23B 27/1622
407/113
2012/0009029 A1  1/2012 Saji
(Continued)

FOREIGN PATENT DOCUMENTS

EP  1575728 A1  12/2007
JP  H09155624 A  6/1997
(Continued)

*Primary Examiner* — Nicole N Ramos
(74) *Attorney, Agent, or Firm* — Corinne R. Gorski

(57) ABSTRACT

An indexable cutting insert has a first corner edge forming a front tip of a cutting edge portion configured to project furthest in the direction of an axis of rotation of an end mill tool receiving the insert. A major cutting edge is descending to come closer to the lower surface of the insert along its extension away from the first corner edge. The minor cutting edge extends from the first corner edge while descending from a point of the cutting edge portion most distant to the lower surface all the way to an inner corner of the insert and has a length of 80%-95% of the length of the major cutting edge including a second corner edge in a side elevation view of the cutting insert.

15 Claims, 3 Drawing Sheets

(58) Field of Classification Search
CPC ...... B23C 2200/246; B23C 2200/0416; B23C 5/207; B23C 5/2221; B23C 5/1024; B23C 5/22; B23C 5/109; B23C 5/2472; B23C 2210/16; B23C 2210/168
See application file for complete search history.

(56) References Cited

U.S. PATENT DOCUMENTS

| | | | |
|---|---|---|---|
| 2015/0139743 A1 | 5/2015 | Ballas | |
| 2016/0214186 A1* | 7/2016 | Mura | B23C 5/109 |
| 2017/0157685 A1* | 6/2017 | Mao | B23C 5/10 |
| 2017/0291231 A1* | 10/2017 | Mao | B23C 5/109 |
| 2017/0326656 A1* | 11/2017 | Saji | B23C 5/109 |

FOREIGN PATENT DOCUMENTS

| | | | |
|---|---|---|---|
| JP | 2006181702 A | 7/2006 | |
| WO | 2015199031 A1 | 12/2015 | |

* cited by examiner

INDEXABLE CUTTING INSERT FOR AN END MILL TOOL AND AN END MILL TOOL PROVIDED WITH SUCH AN INSERT

RELATED APPLICATION DATA

This application is a § 371 National Stage Application of PCT International Application No. PCT/EP2017/050673 filed Jan. 13, 2017 claiming priority to EP 16152998.7 filed Jan. 27, 2016.

TECHNICAL FIELD OF THE INVENTION

The present invention relates to an indexable cutting insert for an end mill tool and an end mill tool provided with such an insert.

Such a double-sided cutting insert is indexable between four index positions when received in an insert pocket in a tool body of an end mill tool for high feed milling including different types of milling operations, for example shoulder milling, ramping, die/mold machining, helical milling/interpolation and vertical milling/plunging. The invention is not restricted to any diameter range of such an end mill tool, but the hexagonal basic shape of the insert makes it particularly suitable for relatively small diameter end mills, such as in the order of 15 mm-30 mm. Such an end mill tool has normally a plurality of pockets to which such a cutting insert is releasably fixed.

A general aim of a cutting insert of this type is to obtain a high feed milling insert for a small diameter end mill, wherein the insert is light/easy cutting and configured to have a particularly wide application range including shoulder milling, slotting, ramping, helical milling/interpolation and plunging.

BACKGROUND ART

WO 2015/199031 A1 discloses a single-sided cutting insert for a high feed cutting end mill tool of a small diameter. A double-sided cutting insert of this type is furthermore disclosed in the brochure "MFH-Raptor-MiNi High Feed Milling Cutter", specifically disclosing a double-sided insert called "MFH-Mini" of Kyocera. However, this cutting insert has a number of properties desired to be improved, especially its ramping capability. It is also an aim to facilitate the manufacturing of this known insert being designed as a double-sided insert.

SUMMARY OF THE INVENTION

The object of the present invention is to provide a cutting insert and an end mill tool of the type defined in the introduction being improved in at least some aspect with respect to such cutting inserts and end mill tools already known.

This object is with respect to the cutting insert obtained by providing such a cutting insert with the claimed features.

The ramping capability, i.e. the maximum ramping angle, of such a cutting insert is improved with respect to cutting inserts known by on one hand since the first minor cutting edge extends from the first corner edge while descending from a point of the cutting edge portion most distant to the lower surface all the way to the inner corner of the insert, which means that the first minor cutting edge may have a comparatively steep slope with respect to the length thereof, and on the other hand since the first minor cutting edge is comparatively long as it extends from the first corner edge, which is located so as to be intersected by said symmetry plane, while descending all the way from said point to the inner corner of the insert and has a length of 80%-95%, of the length of the major cutting edge including the second corner edge in a side elevation view of the insert. The slope of the first minor cutting edge and the length thereof contribute to a possible ramping angle substantially increased with respect to end mill cutting inserts of the type defined in the introduction and disclosed in the background art. Furthermore, the major cutting edge descending all the way from the first corner edge to the second corner edge results in low cutting forces enabling a lighter cut of this major cutting edge dedicated for the majority of chip removal machining compared to the first minor cutting edge designed for chip removal machining in a ramping operation. The location of the first corner edges intersected by said symmetry plane making the insert symmetrical also makes it possible to produce the double-sided insert by uni-axial pressing of the insert. This is not possible for known double-sided inserts according to the brochure "MFH-Raptor-MiNi High Feed Milling Cutter" which have to be manufactured by multi-axial pressing, which is more complex and less precise.

According to an embodiment of the invention the cutting insert is a negative insert with a clearance surface to each cutting edge portion being orthogonal to the lower surface and the top surface of the insert. Thus, there will be one single clearance surface for both upper/lower first corner edge and one single clearance surface for both upper major cutting edge/lower first minor cutting edges. Besides the possibility to manufacture the insert by uni-axial pressing it will also be easier to grind.

According to another embodiment of the invention the point of each cutting edge portion most distant to the lower surface is located on the first corner edge. This feature contributes to the combination of long first minor cutting edge and a comparatively steep slope thereof being advantageous for the ramping capability of the insert.

According to another embodiment of the invention the extension of the descending first minor cutting edge from the point most distant to the lower surface has an average slope of 15°-45° or 20°-40° with respect to said lower surface of the insert. An average slope of ≥15° has a substantial positive influence upon the possible ramping angle for the cutting insert. "Average slope" of an edge is in this disclosure defined as the angle made by a straight line drawn between the start and the end of that edge with the lower surface of the insert.

According to another embodiment of the invention the extension of the descending major cutting edge from the first corner edge to the second corner edge has an average slope of 1°-15° or 2°-10°, which constitutes a slope enabling chip removal machining in the form of high feed cutting milling with cutting forces being relatively low in that context. In order to enhance this light cutting effect even further the major cutting edge may have an average slope of 3°-15° or 5°-10°.

According to another embodiment of the invention the extension of the descending first minor cutting edge includes a concave portion, and according to another embodiment of the invention the extension of the descending major cutting edge includes a concave portion. This concaveness results in smaller cutting forces and a smoother cutting by these cutting edges when cutting, in particular at moderate cutting depths including the concave portion.

According to another embodiment of the invention the cutting edge portion is connected to a second minor cutting edge being formed at the intersection of the peripheral side surface with the top surface along a portion of the straight long side and extending from the second corner edge, whereby the second minor cutting edge is forming an outer peripheral cutting edge of the end mill tool in the state of use. This second minor cutting edge will be used for shoulder milling operation carried out by the cutting insert.

According to another embodiment of the invention a rake surface of the second minor cutting edge has a positive rake angle of 10°-30°, 15°-30° or 20°-30°. Such a positive rake angle reduces the load on the second minor cutting edge and also on the second corner edge connecting thereto reducing the risk of fracture of the second corner edge when carrying out shoulder milling.

According to another embodiment of the invention a rake surface of the major cutting edge has a positive rake angle of 10°-30°, 15°-25° or 20°. A positive rake angle of the major cutting edge of this size results in comparatively low cutting forces even at high feed cutting. It also contributes to good chip formation/evacuation.

According to another embodiment of the invention a rake surface of the first minor cutting edge has a positive rake angle over the entire extension thereof exceeding 10°, being 10°-25° or 15°-25°. A positive rake angle of this magnitude has a reducing influence upon the cutting forces applied on the first minor cutting edge when carrying our ramping by the end mill tool provided with the cutting insert.

According to another embodiment of the invention a clearance chamfer surface making an outer angle of less than 90°, such as 60°-80°, to the lower surface is arranged on the peripheral side surface along the long side of the insert at the connection of that surface to the lower surface and below the second corner edge of each cutting edge portion and/or below the second minor cutting edge. This clearance chamfer surface prolongs the chip breaker of the first minor cutting edge enabling an improved movability in ramping operation, spiral interpolation and in plunging too. But the main benefit from this clearance chamfer surface is that it enables a more positive radial rake of the insert when mounted in an end mill tool without risk of collision of the bottom corner part of the insert with a work piece. This is of particular importance for a double-sided insert which is generally thicker than a single-sided insert.

According to another embodiment of the invention a through-hole for securing the insert in the pocket of the end mill tool body extends from a centre region of the top surface to the lower surface and has a centre axis extending in said symmetry plane, the top surface and lower surface having a first recessed portion surrounding the through-hole so as to provide an annular contact surface on the top surface and lower surface, whereby the double-sided insert is to be supported by said support face of the pocket away from the centre region surrounding the through-hole. This results in an improved stability of the insert when secured in a pocket of an end mill tool.

According to another embodiment of the invention the annular contact surface on the top surface and the lower surface is recessed at the two straight long sides of the insert and along the through-hole on the top surface and lower surface, whereby the top and lower surface is configured with two contact portions on the annular contact surface extending along the two short sides of the insert. This further improves stability of the insert when secured in the pocket of the end mill tool. The influence of any surface defects arising around the through-hole after pressing/sintering of the insert are hereby minimized. In other words, it ensures that a proper bottom support is provided away from the region around the through-hole and in particular that the bottom support is situated below the active cutting edges where cutting forces are acting against the insert.

The object of the present is with respect to the end mill tool obtained by providing such a tool with at least one cutting insert according to the present invention and the further features of the independent claim directed to an end mill tool. The advantages of such an end mill tool appear clearly from the above discussion of a cutting insert according to the invention and the embodiments thereof, in which such an insert enables the end mill tool to be provided with a comparatively small diameter.

Other advantageous features as well as advantages of the present invention appear from the description following below.

BRIEF DESCRIPTION OF THE DRAWINGS

With reference to the appended drawings, below follows a specific description of an embodiment of the invention cited as an example.

In the drawings.

DETAILED DESCRIPTION OF AN EMBODIMENT OF THE INVENTION

Figure 1:
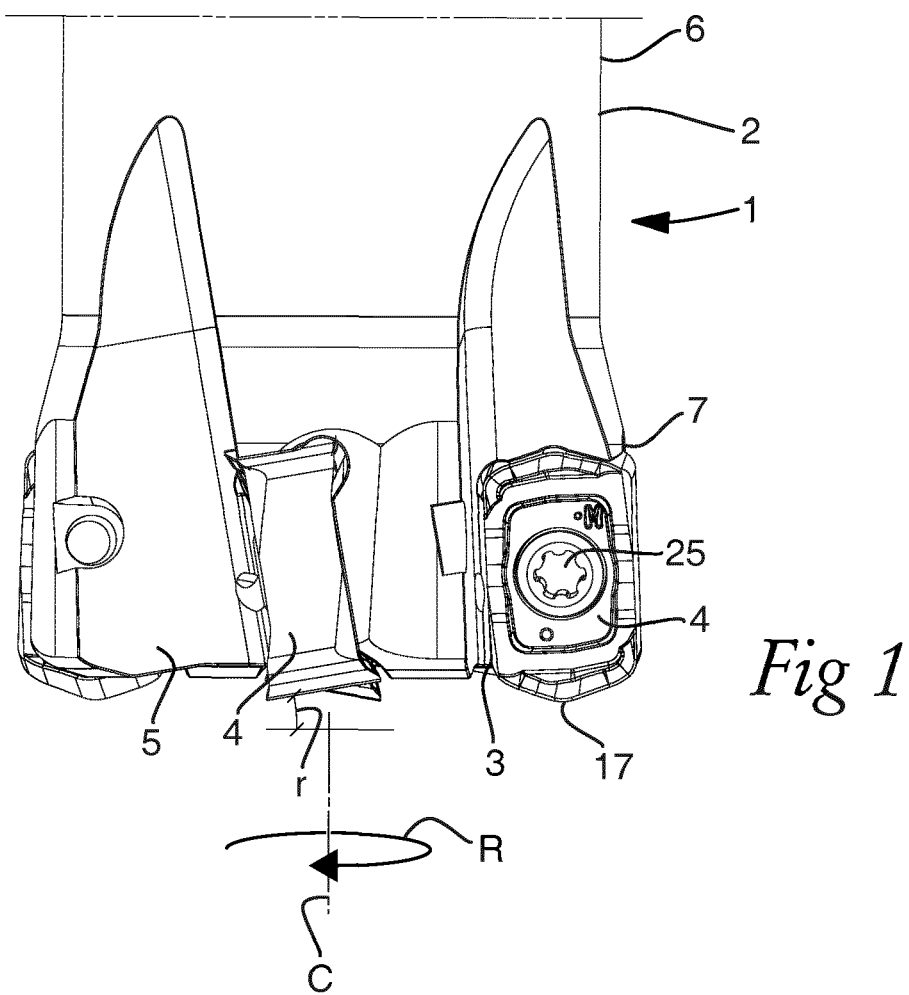
FIG. 1 shows a side elevation view of an end mill tool provided with four cutting inserts according to an embodiment of the invention.
Figure 2:
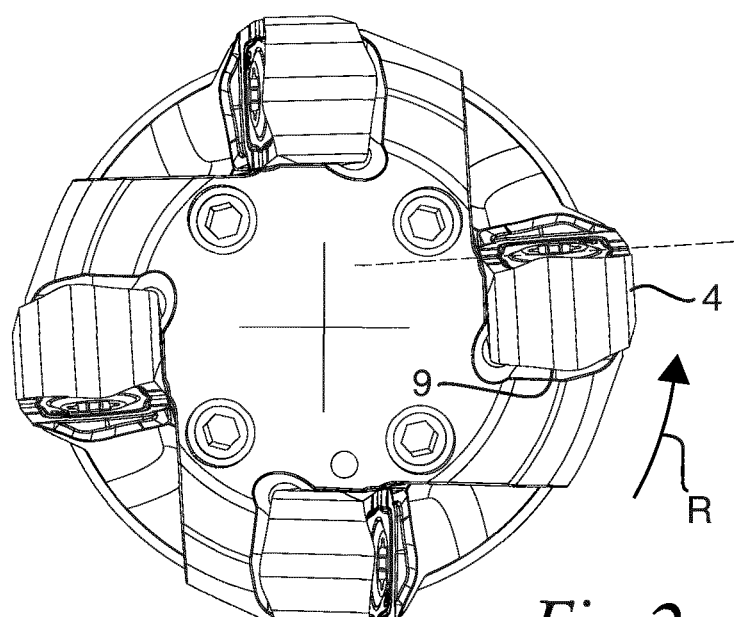
FIG. 2 shows a view from below of the tool shown in FIG. 1.
Figure 3:
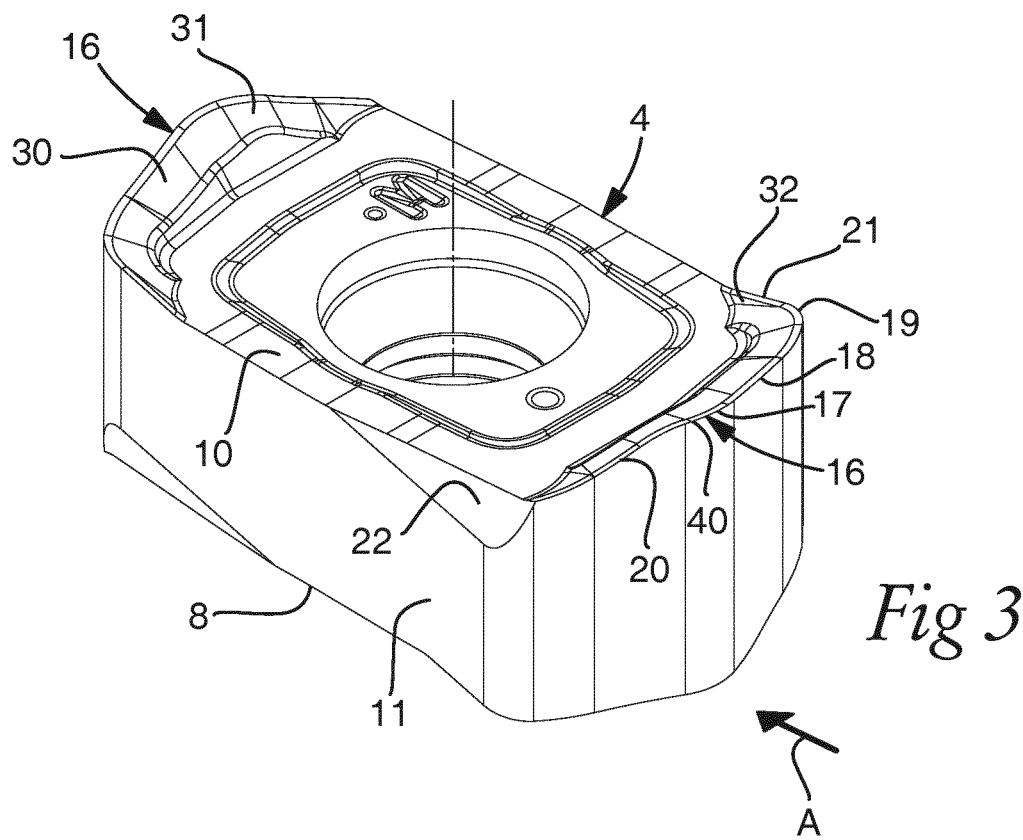
FIG. 3 shows a perspective view obliquely from above of a cutting insert of the tool shown in FIGS. 1 and 2.

An end mill tool 1 for carrying out high feed milling in the form of shoulder milling, ramping, die/mold machining, helical milling/interpolation and vertical milling/plunging according to an embodiment of the invention is shown in FIG. 1. The tool has a tool body 2 having four seats or pockets 3 each receiving an indexable cutting insert 4 according to the invention releasably fixed to the pocket. The tool body has a circular cylindrical basic shape but may have another shape. The tool body 2 includes a front end 5 and a rear end 6 (in fact more distant to the front end than shown in FIG. 1) between which a central rotation axis C extends around which the tool is rotatable in a direction of rotation R. The pockets 3 are formed in a transition between the front end and an envelope surface 7 extending between the front end 5 and the rear end 6 of the tool body.

The cutting insert will now be described while making reference simultaneously to FIGS. 2-7. The cutting insert 4 may typically be made of cemented carbide comprising wear resistant coating(s). The cutting insert is double-sided or reversible, which means that the top and bottom thereof have the same design, but the side shown with the orientation of the insert in the figures as the upper side will hereinafter be called the top, although it may just as well be the bottom or lower side of the insert. Accordingly, the insert has as seen in the figures a hidden lower surface 8 configured to be supported by a support face 9 of a pocket 3 of the tool body 2, a top surface 10 and a peripheral side surface 11 connecting the lower surface 8 and the top surface 10. The insert has a hexagonal basic shape as seen perpendicularly to the lower surface or the top surface as in FIG. 5 with two straight and parallel long sides 12, 13 and two v-shaped short sides 14, 15. A cutting edge portion 16 is formed at the intersection of the peripheral side surface 11 with the top surface 10 and with the lower surface 8 along each v-shaped short side 14, 15, so that the insert has four such cutting edge portions 16.

Figure 4:
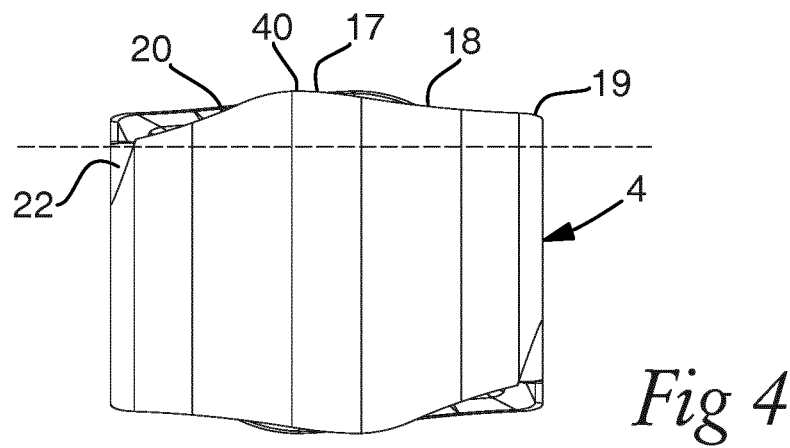
FIG. 4 shows a side elevation view of the cutting insert shown in FIG. 3 from the direction of the arrow A in FIG. 3.

Each cutting edge portion 16 comprises a first corner edge 17 configured to form a front cutting tip on the v-shaped short side configured to project furthest in the direction of the central rotation axis C of the end mill tool in the state of use as shown in FIG. 1. A longitudinal symmetry plane P (see FIG. 5) extending perpendicularly to the lower and top surfaces 8, 10 divides the insert into two equal parts having a two-fold (i.e. 180°) rotational symmetry and intersects the four first corner edges 17. In this embodiment the first corner edge 17 includes the point 40 (see FIG. 4) of the cutting edge portion most distant to the lower surface 8 (considering that the cutting edge portion is located at the top side of the insert). A major cutting edge 18 dedicated for the majority of chip removal machining of the insert extends from the first corner edge 17 in a first direction on the v-shaped short side outward to a second corner edge 19 located at an outer corner of the front end 5 of the end mill tool in the state of use. The extension of the major cutting edge from the first corner edge to the second corner edge is descending to come closer to the lower surface of the insert with an average slope of about 10°. A first minor cutting edge 20 extends from the first corner edge in a second direction on the v-shaped short side opposite to the first direction of the major cutting edge towards an inner corner 23 of the insert in the state of use while also descending with an average slope in the order of 20° with respect to the lower surface. The first minor cutting edge is designed for chip removal machining in a ramping operation. This first minor cutting edge 20 extending to the inner corner 23 has here a length of 2.19 mm, which is 89% of the length (2.45 mm) of the major cutting edge 18 including the second corner edge 19 as seen in a side elevation view of the insert. The major cutting edge 18 has here in fact a length of 2.15 mm in a side elevation view of the insert and the second corner edge 19 a length of 0.30 mm in this view. The length on the second corner edge 19 depends on its radius (in a view from above of the cutting insert), whereby a larger radius provides a relatively longer portion of the total length of the major cutting edge and second corner edge. It appears especially from FIGS. 3 and 6 that the major cutting edge 18 as well as the first minor cutting edge 20 have a rake surface 30 and 31, respectively with a positive rake angle α and β, respectively, of about 20°. FIG. 4 shows that the extensions of the major cutting edge and the first minor cutting edge are slightly concave. It appears from FIG. 5 that the major cutting edge 16 as well as the first minor cutting edge 20 has a slope $S_1$ and $S_2$, respectively, in a top view of the insert. These two slope angles $S_1$ and $S_2$ are here both about 17°. A steeper slope in a top view of the insert will also increase the maximum possible ramping angle of the end mill tool. However, a steeper slope in this top view will also increase the so called entering angle on the major cutting edge, which reduces the feed rate in high feed milling due to an increased chip thickness with larger entering angles (i.e. larger slope $S_1$ and $S_2$).

The cutting edge portion 16 is connected to a second minor cutting edge 21 being formed at the intersection of the peripheral side surface 11 with the top surface 10 along a portion of the straight long side and extending from the second corner edge 19 whereby the second minor cutting edge 21 is forming an outer peripheral cutting edge of the end mill tool in the state of use. Thus, the second corner edge is a radius cutting edge located between the major cutting edge 18 and the second minor cutting edge 21. Also this second minor cutting edge has a rake surface 32 with a positive rake angle in the order of 20°. Furthermore, a clearance chamfer surface 22 making an outer angle of less 90°, here about 75°, to the lower surface is arranged on the peripheral side along the long side of the insert at the connection of that surface to the lower surface and below the second corner edge 19 of each cutting edge portion 16. It can also be seen that the first minor cutting edge 20 extends to the clearance chamfer surface 22 provided at the inner corner 23 of the insert.

Finally, the cutting insert has a through-hole 24 for securing the insert in a pocket 3 of the end mill tool body by tightening a screw 25 and this hole extends from a centre region 26 of the top surface 10 to the lower surface 8. The through-hole 24 has its centre axis D extending in said symmetry plane P of the insert. The lower surface (and then also the top surface as a consequence of the insert being double-sided) has a first recessed portion 27 surrounding the through-hole 24 so as to provide an annular contact surface 28 on the top surface 10 and the lower surface 8 to be supported by the bottom support faces 9 of a pocket away from the centre region 26 surrounding the through-hole 24 for obtaining a stable support of the insert when secured in the pocket. The annular contact surface 28 has also a second recessed portion 33 at the two straight long sides 12, 13 of the insert and along the through-hole 24 on the top surface 10 and the lower surface 8, whereby the top and lower surface is configured with two contact portions on the annular surface extending along the two short sides of the insert.

The possible use and function resulting from the design of the cutting insert described above and especially from the appearance of the cutting edge portions thereof will now be disclosed. The cutting insert is a negative insert with a clearance surface (peripheral side surface of the v-shaped short sides 14, 15) to each cutting edge portion being orthogonal to the lower surface and the top surface of the insert, so it has to be arranged with a radial rake (see FIGS. 1 and 2) of about −12°. It is also secured in the pocket with an axial rake r of −10° for getting a clearance axially, and the radial rake angle can be provided more positive (by 3°) thanks to the existence of the clearance chamfer surface 22 than possible without this surface.

The first corner edge 17 is capable of functioning as an edge creating a surface on the work piece. The major cutting edge 18 is dedicated for the majority of chip removal machining while being directed to the outer peripheral side of the tip of the end mill tool body 2. The descending profile of the major cutting edge from the first corner edge 17 to the second corner edge 19 and the positive rake angle of this cutting edge reduce the load thereon resulting in a lighter cutting and a reduced risk of fracture of the more sensitive second corner edge.

The first minor cutting edge 20 is used for ramping operation while being directed to the inner front side of the end mill tool and the entire first minor cutting edge will engage a work piece at the maximum possible ramping angle. The slope of the first minor cutting edge and the length thereof with respect to the major cutting edge decide the magnitude of said maximum ramping angle and these two parameters are for the cutting insert according to the present invention selected so that this ramping angle is remarkably increased with respect to known cutting inserts of the type defined in the introduction. The slopes of the major cutting edge and the first minor cutting edge in top view do also influence the ramping capability positively. More exactly, the maximum ramping angle is for a 16 mm diameter end mill tool according to the invention 3.9°, which is 39% higher than for the insert disclosed above under background art and for a 25 mm diameter tool 3°, which is 150% higher than the known double-sided cutting insert. The larger ramping angle also results in a larger possible spiral pitch depth in helical milling/interpolation. The clearance chamfer surface 22 next to the first minor cutting edge 20 results in a longer chip breaker than the known cutting insert, which enables a better movability in ramping operation, spiral pitch and in vertical milling/plunging. The second minor cutting edge 21 is used to cut in a work piece when carrying out shoulder milling.

Furthermore, the negative insert according to the present invention will be possible to produce with a simple conventional technique, i.e. by uni-axial powder pressing, resulting in lower production costs than for the known double-sided cutting insert discussed above for which this is not possible but multi-axial pressing, grinding or similar machining has to be used for obtaining the insert design. The recessed portions are important features of a double-sided insert with raised cutting edges, because such an insert is impossible to grind to secure stable support on the lower support surface. It will also be simpler to obtain good axial support of the insert in a tool pocket and the insert will have a better stability thanks to the extension of the clearance surfaces orthogonal to the top and the lower side of the insert.

The invention is of course not restricted to the embodiment thereof described above, but many possibilities to modifications thereof would be apparent to a person with skill in the art without departing from the scope of invention as defined in the appended claims.

As a few of numerous possible modifications it may be mentioned that the tool body may have any other number of pockets for receiving cutting inserts, and the insert may be mounted at a different radial and/or axial rake as long as there is significant clearance to the workpiece. Providing the insert at more negative radial rake may for instance make the clearance chamfer surface unnecessary, whereby the insert may be provided with an inner third corner cutting edge in its place.

Figure 5:
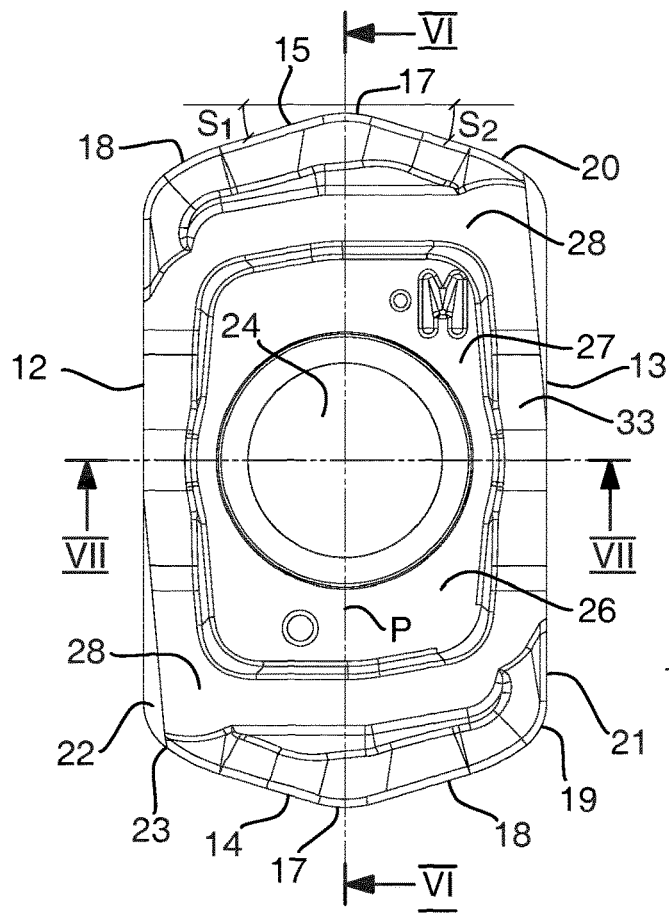
FIG. 5 shows a view from above of the cutting insert shown in FIG. 3, and FIGS. 6 and 7 are cross-section views of the cutting insert shown in FIG. 5 along the lines VI-VI and VII-VII, respectively.
Figure 6:
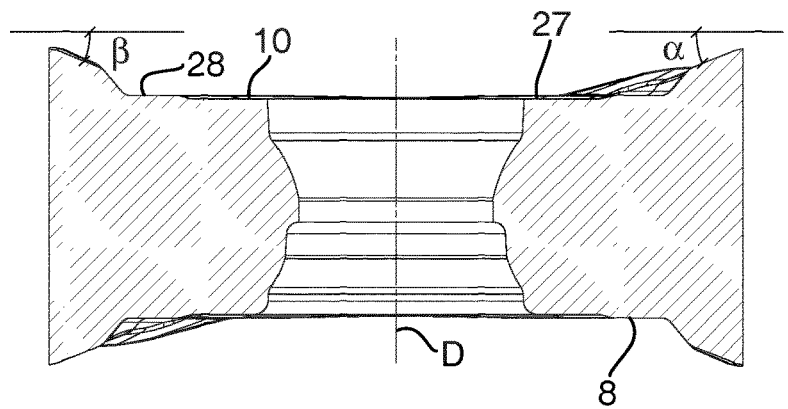
Figure 7:
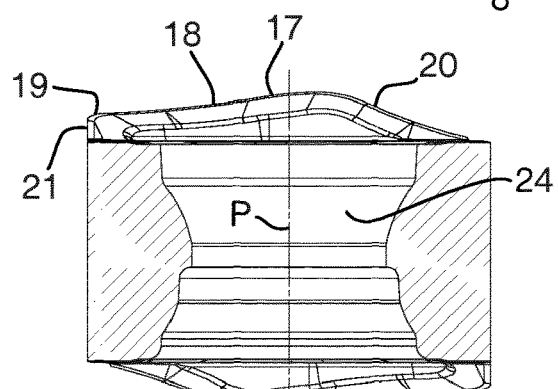

The lengths of the cutting edges referred to in this disclosure are the lengths thereof in a side elevation view of the insert, so that the length of the first minor cutting edge is in the embodiment shown in the figures about 89% of the length of the major cutting edge including the second corner edge, although the lengths of these cutting edges appear to be the same as seen in the top view of FIG. 5.

The point of the cutting edge portion most distant to the lower surface may be located on the first minor cutting edge close to the first corner edge.

That the first minor cutting edge descends from said point most distant to the lower surface means in the case this point is located on the first corner edge of course that the first minor cutting edge descends from the start thereof at its border to the first corner edge.

The invention claimed is:

1. An indexable cutting insert for an end mill tool, the cutting insert comprising:
a lower surface configured to be supported by a support face of a pocket of a tool body of the end mill tool;
a top surface; and
a peripheral side surface connecting the lower surface and the top surface, the cutting insert having a hexagonal basic shape as seen perpendicularly to the top surface and having two straight long sides and two v-shaped short sides, the cutting insert being double-sided such that the lower and top surfaces are identical and a cutting edge portion is formed at an intersection of each of the lower and top surfaces with the peripheral side surface of the insert along each v-shaped short side, wherein each cutting edge portion includes a first corner edge forming a front cutting tip on the v-shaped short side, the first corner edge projecting furthest in a direction of an axis of rotation of said end mill tool in a state of use, a major cutting edge extending from said first corner edge in a first direction on the v-shaped short side, the major cutting edge extending outward to a second corner edge located at an outer corner of the end mill tool in the state of use, and a first minor cutting edge extending from the first corner edge in a second direction on the v-shaped short side, opposite to the first direction of the major cutting edge, the first minor cutting edge extending towards an inner corner of the insert in the state of use, wherein four, one for each v-shaped short side on both the lower and top surface of the insert, first corner edges are intersected by a symmetry plane dividing the insert into two equal parts, the symmetry plane being perpendicular to the lower and top surfaces, the major cutting edge, in its extension from the first corner edge to the second corner edge, is descending so as to come closer to the lower surface of the insert along an extension away from the first corner edge, and wherein the first minor cutting edge in its extension descends from said first corner edge, at a point of the cutting edge portion most distant from the lower surface, to the inner corner of the insert, the first minor cutting edge having a length of 80%-95% of the length of the major cutting edge, wherein the major cutting edge includes the second corner edge in a side view of the insert and the point of the cutting edge portion most distant from the lower surface is located on the first corner edge.

2. The cutting insert according to claim 1, wherein the cutting insert is a negative insert with a clearance surface to each cutting edge portion being orthogonal to the lower surface and the top surface of the insert.

3. The cutting insert according to claim 1, wherein an extension of the first minor cutting edge descends from the point most distant from the lower surface and has an average slope of 15°-45° or 20°-40° with respect to said lower surface.

4. The cutting insert according to claim 1, wherein the extension of the major cutting edge descending from the first corner edge to the second corner edge has an average slope of 1°-15° or 2°-10°.

5. The cutting insert according to claim 3, wherein the extension of the descending first minor cutting edge includes a concave portion.

6. The cutting insert according to claim 4, wherein the extension of the descending major cutting edge includes a concave portion.

7. The cutting insert according to claim 1, wherein the cutting edge portion is connected to a second minor cutting edge formed at the intersection of the peripheral side surface with the top surface along a portion of the straight long side and extending from the second corner edge, the second minor cutting edge forming an outer peripheral cutting edge of the end mill tool in the state of use.

8. The cutting insert according to claim 7, wherein a rake surface of the second minor cutting edge has a positive rake angle of 10°-30°, 15°-30° or 20°-30°.

9. The cutting insert according to claim 1, wherein a rake surface of the major cutting edge has a positive rake angle of 10°-30°, 15°-25° or 20°.

10. The cutting insert according to claim 1, wherein a rake surface of the first minor cutting edge has a positive rake angle of at least 10° over the entire extension of the minor cutting edge.

11. The cutting insert according to claim 1, wherein a clearance chamfer surface making an outer angle of less than 90° from minor cutting edge towards the lower surface is arranged on the peripheral side surface along the long side of the insert at the connection of that surface to the lower surface and below the second corner edge of each cutting edge portion.

12. The cutting insert according to claim 1, wherein a through-hole for securing the insert in the pocket of the end mill tool body extends from a centre region of the top surface to the lower surface and has a centre axis extending in said symmetry plane, the top surface and lower surface having a first recessed portion surrounding the through-hole so as to provide an annular contact surface on the top surface and lower surface, the double-sided insert being supported by said support face of the pocket away from the centre region surrounding the through-hole.

13. The cutting insert according to claim 12, wherein the annular contact surface is recessed at the two straight long sides of the insert and along the through-hole on the top surface and lower surface, the top and lower surface being configured with two contact portions on the annular contact surface extending along the two short sides of the insert.

14. An end mill tool comprising:
at least one cutting insert according to claim 1; and
a tool body including a front end and a rear end between which a central rotation axis extends around and which the tool is rotatable in a direction of rotation, at least one insert pocket formed in a transition between the front end and an envelope surface extending between the front end and the rear end of the tool body, and fastening means configured to secure the insert in the pocket while pressing portions of the lower surface thereof against a support face of the pocket so that the corner edge of a cutting edge portion of the insert projects furthest in the direction of the central rotation axis.

15. The cutting insert according to claim 10, wherein the positive rake angle is in the range of 10°-25° or 15°-25°.

* * * * *